United States Patent [19]
Fennel et al.

[11] Patent Number: 5,197,788
[45] Date of Patent: Mar. 30, 1993

[54] CIRCUIT CONFIGURATION FOR AN ANTI-LOCK BRAKE SYSTEM

[75] Inventors: Helmut Fennel, Bad Soden; Gunther Buschmann, Griesheim; Norbert Ehmer, Bad Orb; Frank Jourdan, Buettelborn, all of Fed. Rep. of Germany

[73] Assignee: Alfred Teves GmbH, Frankfurt am Main, Fed. Rep. of Germany

[21] Appl. No.: 699,862

[22] Filed: May 14, 1991

[30] Foreign Application Priority Data

May 17, 1990 [DE] Fed. Rep. of Germany ....... 4015866

[51] Int. Cl.$^5$ .................. B60T 8/32; B60T 8/44; B60T 8/48; B60T 8/60
[52] U.S. Cl. .................. 303/100; 188/181 A; 303/110; 303/105; 303/113.4; 303/114.3; 303/119.1; 303/116.4
[58] Field of Search .................. 303/10–12, 303/100, 116 R, 116 SP, 116 PC, 116 WP, 113 R, 113 SS, 91, 119 R, 114 R, 92, 114 PB, DIG. 3, DIG. 4, 113 TR, 113 TB, 114 PN, 105, 110; 188/181 A, 181 R; 180/197; 417/36, 38; 60/413, 418

[56] References Cited
U.S. PATENT DOCUMENTS

| | | | |
|---|---|---|---|
| 3,706,479 | 12/1972 | Klein | 188/181 A X |
| 4,025,124 | 5/1977 | Fuchs | 303/116 PC |
| 4,509,802 | 4/1985 | Solleder et al. | 303/57 X |
| 4,523,791 | 6/1985 | Belart et al. | 303/DIG. 3 |
| 4,569,560 | 2/1986 | Kubo | 303/116 R |
| 4,580,847 | 4/1986 | Burgdorf | 303/100 |
| 4,611,859 | 9/1986 | Otsuki et al. | 303/116 R X |
| 4,640,555 | 2/1987 | Bertling et al. | 303/10 |
| 4,680,713 | 7/1987 | Kubo | 303/105 X |
| 4,718,733 | 1/1988 | Fujita et al. | 303/10 X |
| 4,738,493 | 4/1988 | Inagaki et al. | 303/116 R |
| 4,783,125 | 11/1988 | Belart et al. | 303/116 R X |
| 4,826,255 | 5/1989 | Volz | 303/11 X |
| 4,880,282 | 11/1989 | Makino et al. | 303/10 X |
| 4,892,364 | 1/1990 | Burgdorf | 303/116 R |
| 4,919,493 | 4/1990 | Leiber | 303/DIG. 3 |
| 4,919,496 | 4/1990 | Burgdorf et al. | 303/10 X |
| 4,940,293 | 7/1990 | Burckhardt et al. | 303/113 TR |
| 5,005,525 | 3/1991 | Reinartz et al. | 303/11 X |

*Primary Examiner*—Douglas C. Butler
*Attorney, Agent, or Firm*—Robert P. Seitter; J. Gordon Lewis

[57] ABSTRACT

A circuit configuration for an anti-lock brake system, including a master cylinder (1) with a travel switch (27, 27') and an electromotively (31, 31') driven hydraulic pump (32, 32'), disposes of a "pump control" (45) which switches on the drive motor (31, 31') of the hydraulic pump (32, 32') in dependence on the vehicle deceleration and on the pressure fluid requirement during an anti-lock controlled braking operation, or on corresponding criteria and test results.

5 Claims, 2 Drawing Sheets

CIRCUIT CONFIGURATION FOR AN ANTI-LOCK BRAKE SYSTEM

INTRODUCTION

The present invention relates to a circuit configuration for an anti-lock hydraulic brake system comprising a master cylinder with a one-point travel switch or a multistage travel switch or with a travel sensor which latter switches on and off an electromotively driven hydraulic pump serving as an auxiliary-pressure source in dependence on the forward piston stroke or a corresponding measured quantity. The circuit configuration has for its purpose to regulate the auxiliary-energy supply and to position the brake pedal in an open-circuit hydraulic anti-lock system wherein pressure fluid out of the wheel brakes is discharged via outlet valves into a pressure compensating reservoir for the pressure reduction during an anti-lock control operation. The pressure fluid is delivered back into the brake system by means of a hydraulic pump.

BACKGROUND OF THE INVENTION

An anti-lock brake system of this type is known already from German published patent application 37 31 603 which comprises a master cylinder to which the wheel brakes are connected via inlet valves. When actuated, outlet valves which are closed in their inactive position establish a pressure fluid connection from the wheel brakes to a pressure compensating reservoir. By means of a hydraulic pump, the pressure fluid is supplied from the supply reservoir back into the brake system, namely into the master cylinder, in consequence whereof simultaneously the working pistons of the master cylinder and hence the brake pedal as well are reset and positioned.

The master cylinder of this known brake system is equipped with travel sensors which permit to switch the hydraulic pump on and off in dependence on the forward stroke of the pistons. The master cylinder piston will be reset by way of switching on of the pump and development of a corresponding auxiliary pressure until the travel sensor responds and switches the pump off. This way the pistons and hence the brake pedal are positioned by virtue of the travel sensor in conjunction with the activated hydraulic pump.

Major difficulties are involved in practical operation to devise the adjustment of the pistons' position and/or the switching on and off of the pump in dependence on the actual pressure fluid requirement in such a manner that under various conditions and tolerances exactly the right quantity of pressure fluid is always delivered. A too small rate of delivery or a too late activation of the pump must be avoided by any means for safety reasons, while a sudden and excessive pedal resetting action is very unpleasant for the driver. Moreover, a too frequent operation of a hydraulic pump results in the occurrence of undesirable noise.

BRIEF DESCRIPTION OF THE INVENTION

Therefore, it is an object of the present invention to overcome this shortcoming and to devise a circuit configuration which under most various conditions, in particular in the presence of differing friction values and varying pilot pressure, positions the pedal in a comfortable manner and ensures that a sufficient amount of spare fluid is preserved in the master cylinder even in situations with great pressure fluid requirement.

It has proven now that this object can be achieved by means of a circuit configuration of the type initially referred to, the special features of which reside in that the switching on of the hydraulic pump is controllable in dependence on the vehicle deceleration and on the actual pressure fluid requirement during an anti-lock controlled braking operation or on criteria and test results which determine the pressure fluid requirement.

According to a favorable type of embodiment of the instant invention, there is provision of circuits which determine variable bridging times (Tü) responsive to the vehicle deceleration which, furthermore, ascertain the pressure-decrease times and/or pressure-increase times occurring during a control cycle and/or count the stable phases on the front wheels and which compare the pressure-decrease times and pressure-increase times and the number of the stable phases with predetermined limit values, the exceeding of which—irrespective of the pump control by the travel switch or travel sensor—has as a consequence activation of the hydraulic pump until the next pressure-decrease phase or until the expiry of a minimum period of time.

According to this invention, consequently, the switching on and off of the pump is at first—irrespective of the travel switch or travel sensor—conformed very precisely to the actual pressure fluid requirement which, above all, is dependent on the instantaneous coefficient of friction and the brake actuation, namely on the pilot pressure which developed due to the pedal force. An unnecessary or too long activation of the pump and excessive resetting of the pedal caused thereby are avoided. The pump will be switched on through the pedal travel switch—irrespective of other criteria—only after the piston has covered a specific distance. The auxiliary pressure supply will be connected in dependence on the pressure fluid requirement even in the event of malfunction of the pedal travel switch.

Another type of embodiment of the inventive circuit configuration resides in that predetermined bridging times in stages to the vehicle deceleration, with the bridging time being relatively short at a high amount of vehicle deceleration and increasing when the vehicle deceleration diminishes. In one embodiment the bridging time ranges between 0.5 and 1.5 sec at a maximum limit value of the vehicle deceleration of roughly 0.7 G (G referring to the constant of acceleration due to gravity of 9.81 m/sec$^2$) and will assume a maximum value of 4.5 to 8 sec at a minimum limit value of roughly 0.1 G.

Further, the present invention arranges for the circuits to react specifically, that means in a predetermined differing fashion, to great vehicle deceleration, to great until medium vehicle deceleration, to medium and also low vehicle decelerations. Hence follows that, for example, in the presence of the relatively great vehicle deceleration, the hydraulic pump can be switched on as soon as the pressure-decrease times and/or the pressure-increase times which are measured during the bridging time will exceed predetermined limit values. The hydraulic pump will be switched on in the presence of great until medium vehicle deceleration as soon as, during the bridging time, the number of the stable phases occurring on the front wheels exceeds a predetermined limit value on the front wheels, or when the pressure-decrease and pressure-increase times exceed predetermined limit values in the event of the number of stable phases being below a predetermined limit value. The hydraulic pump will be switched on in the presence of and low vehicle deceleration as soon as the number of the stable phases detected on the front wheels during the bridging time exceeds a limit value responsive to the vehicle deceleration, and the vehicle deceleration measurement will be repeated when these limit values are not reached, and a new limit value will become decisive for the activation of the hydraulic pump.

Further features, advantages and possibilities of application of this invention can be taken from the following description of an embodiment with reference to the accompanying drawings.

DETAILED DESCRIPTION OF THE PREFERRED EMBODIMENT OF THE INVENTION

Figure 1:
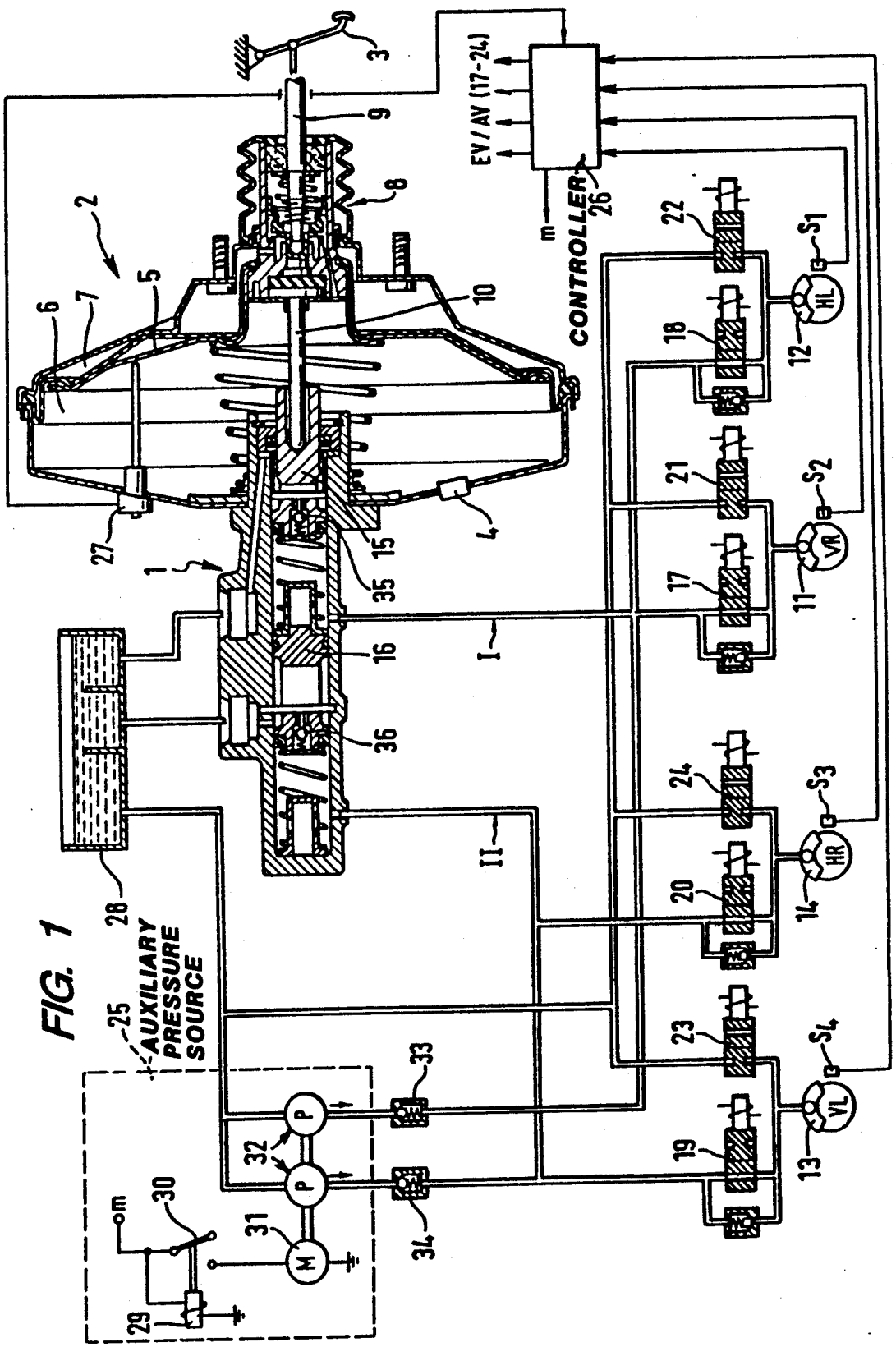
FIG. 1 is a schematic illustration of an embodiment of an anti-lock brake system for which the inventive circuit configuration can be used.

FIG. 1 serves to explain the most important component parts and the mode of operation of an anti-lock brake system for use in which the inventive circuit configuration is meant.

The braking pressure generator of the illustrated brake system is substantially composed of a tandem master cylinder 1 with an aggregate 2 inserted in front thereof which serves as a vacuum booster and on which the driver is acting by means of a brake pedal 3. A coupling element 4 for connecting the vacuum aggregate 2 to a vacuum source is indicated.

The interior of the vacuum aggregate 2 is subdivided into two compartments 6, 7 by a working piston respectively a diaphragm 5. Vacuum prevails in both compartments 6, 7 in the brake release position. On brake application, a dosed quantity of air is introduced into the compartment 7 via a valve 8 on which the pedal force is applied via a push rod 9, in consequence whereof the vacuum pressure prevailing in this compartment is reduced and the working piston 5 is displaced in the direction of pedal application. Via another push rod 10 in the interior of the vacuum aggregate 2, a boosted force which is proportional to the force exerted on the brake pedal 3 is transmitted onto pistons 15, 16 of the master cylinder 1. A braking pressure proportional to the actuating force is caused in brake circuits I, II and in wheel brakes 11, 12; 13, 14 connected to these.

To perform an anti-lock control operation, the brake system according to FIG. 1 is furnished in a known fashion with inlet valves and outlet valves 17 to 24 and besides with an auxiliary-pressure source 25, with wheel sensors S1 to S4 and with an electronic controller 26. There is likewise provision of a travel switch or travel sensor 27 which is of special importance for the inventive circuitry and thus for regulating the auxiliary energy supply as well as for positioning the master cylinder pistons 15, 16 and, respectively, the brake pedal 3.

A pressure fluid reservoir 28 having the capacity of a supply tank is required for both the basic function of the illustrated brake system and for the pressure compensation and, respectively, for receiving the pressure fluid discharging through the outlet valves 21 to 24 during an anti-lock control operation.

The information necessary for the anti-lock control is fed to the controller 26 by means of the wheel sensors S1 to S4 and the travel switch or travel sensor 27. In this controller 26 which comprises one or more microcomputers in a preferred embodiment, the supplied signals are conditioned, logically combined and assessed for the purpose of generating braking pressure control signals which serve to actuate the inlet valves and outlet valves 17 to 24. Another outlet m leads to a relay 29 and via a switch 30 actuated by this relay to an electric drive motor 31 of a hydraulic pump 32 which pertains to the auxiliary pressure source 25. In the embodiment illustrated, a hydraulic pump 32 with two hydraulically isolated circuits and a joint drive by the electric motor 31 is employed.

The pressure sides of the pump circuits are connected directly to the brake circuits I, II via non-return valves 33, 34. Control valves 35, 36 designed as central valves in the interior of the master cylinder 1 reduce the auxiliary pressure to a pressure proportional to pedal force when the hydraulic pump 32 is switched on.

The hydraulic pump 32 is switched off in the "normal case". Principally, the motor 31 is being activated only after, or simultaneously with, the commencement of an anti-lock control operation, however, only under certain conditions and when a predefined piston stroke is exceeded which is sensed by the travel switch or travel sensor 27.

Basically, the auxiliary pressure source 25 is dimensioned such that the rate of delivery of the pump 32 is sufficient even in the event of a control operation with a particularly high energy consumption. In the case that the quantity of pressure fluid supplied is in excess of the pressure fluid requirement or, respectively, the quantity of pressure fluid discharging through the outlet valves 21 to 24, the master cylinder pistons 15, 16 will be reset suddenly (almost) up to their stop. The central valves 35, 36 will not open until the pistons have adopted their initial position. This sudden resetting of the brake pedal is confusing for the driver, it impairs the pedal comfort.

The inventive circuit configuration permits to avoid this vexing resetting of the brake pedal by way of controlling the auxiliary pressure source and/or the hydraulic pump in dependence on the vehicle deceleration and on the actual pressure fluid requirement during a braking operation with anti-lock control. The travel switch 27—a one-point switch is meant herein, yet principally the same considerations apply when a more sophisticated travel sensor is used which senses a number of positions—is in most cases not utilized for the auxiliary pressure control in the beginning.

In principle, the inventive circuit configuration makes a distinction between the following situations:

A) In the presence of low to medium friction value (coefficient of friction) and low pilot pressure, which latter is responsive to the force exerted on the brake pedal, the motor-pump aggregate (31, 32) is driven in dependence on the pressure-increase and pressure-decrease times which are determined by the actuation of the inlet valves and outlet valves (17 to 20; 21 to 24), in dependence on the friction value and the control frequency. The friction value is dictated by the vehicle deceleration; the number of the stable phases on the front wheels per time unit is a standard for the control frequency. The set point of the travel switch 27 is generally not yet reached in these situations. The motor-pump aggregate (31, 32) is actuated pulsewise to precisely adapt the pressure fluid requirement.

B) In the presence of high friction value and high pilot pressure the travel switch 27 will start to function. The actuation of the motor-pump aggregate (31, 32) is performed by the travel switch 27 in first place.

Hereinbelow, case A) will be explained in more detail to begin with.

Bridging times $T_Ü$ are fixed in dependence on the instantaneous vehicle deceleration and/or are assigned to the vehicle deceleration. Friction-value-adaptive bridging times are ascertained from the vehicle deceleration so-to-speak. In one embodiment, this allocation is carried out according to the following pattern:

|     | vehicle deceleration $V_{FZG}$ | bridging time $T_Ü$ |
|-----|--------------------------------|---------------------|
| I.  | >=0.71 G                       | 0.8 sec             |
|     | >=0.47 G                       | 1.2 sec             |
| II. | >=0.35 G                       | 1.6 sec             |
|     | >=0.28 G                       | 2.0 sec             |
| III.| >=0.24 G                       | 2.4 sec             |
|     | >=0.20 G                       | 2.8 sec             |
|     | >=0.18 G                       | 3.2 sec             |
|     | >=0.16 G                       | 3.6 sec             |
|     | >=0.14 G                       | 4.0 sec             |
| IV. | >=0.13 G                       | 4.4 sec             |
|     | >=0.12 G                       | 4.8 sec             |

Vehicle decelerations of >=0.47 G are considered as relatively great (group I), vehicle decelerations >=0.28 G as great to medium (group II), vehicle decelerations >=0.14 G as medium (group III) and decelerations >=0.12 G as low (group IV).

The reaction of the inventive circuit configuration on the measured vehicle deceleration is dictated by the above-mentioned distinction. A time function element will be started with each phase of pressure increase and, respectively, pressure re-increase after a preceding pressure decrease as a reaction on an imminent locking, the operation time of which element represents the vehicle-deceleration responsive "bridging time" indicated above. Once a predetermined pressure-decrease time and a predetermined pressure-increase time is reached or exceeded during a bridging time, the motor 31 of the hydraulic pump 32 will be switched on as long as until the next pressure-decrease phase is reached, or until the expiry of the minimum time period. These pressure-decrease and pressure-increase times can also be set by counting the valve-actuation pulses. In the present embodiment, a decrease time of 255 units (one unit corresponds e.g. to 1 to 1.5 msec) and a pressure increase by 25 pulses are defined as limit values. The minimum switching period of the motor roughly amounts to 100 msec.

In the embodiment to which the above-mentioned figures refer, the control of the energy supply is defined by actuation of the motor-pump aggregate (31, 32) according to the groups I to IV as follows:

I. With a bridging time $T_Ü=0.8$ sec or 1.2 sec, that means in the presence of a relatively great vehicle deceleration, the case referred to hereinabove under B) applies. The hydraulic pump 32 will be switched on. The travel switch 27 effects the positioning of the master cylinder pistons and of the brake pedal 3.

II. With bridging times of $T_Ü=1.6$ sec or 2.0 sec, the inventive circuit configuration counts the number of the stable phases occurring on the front axle. Once the anti-lock control finds only one wheel of the front axle, because only one wheel became unstable, the stable phases will count twice. In case more than 10 stable phases are found during the bridging time, the hydraulic pump will be switched on. If this limit value of 10 phases is not reached, the deceleration measurement will be re-started, whilst, however, other criteria will be taken into account now: again the pressure-decrease and pressure-increase times and/or the actuation of inlet valves and outlet valves are decisive; when more than 16 increase pulses are counted, the pump will be switched on and operates for as long as until the next pressure-decrease phase is reached and is exceeded by 100 msec.

III. In the presence of bridging times of 2.4 sec, 2.8 sec, 3.2 sec, 3.6 sec or 4.0 sec, again the stable phases occurring on the front wheels will be counted. However, now the limit value is 15 phases. The hydraulic pump will be switched on when more than 15 phases are counted. If this limit value of 15 phases is not attained, a new deceleration measurement will be performed, whilst now, in turn, the limit values and reactions mentioned hereinabove under II. apply.

IV. In the presence of bridging times of 4.4 sec or 4.8 sec the limit value for the stable phases occurring on the front axle is 25. The hydraulic pump will be switched on when more than 25 phases are counted. If this limit value is not attained, the deceleration measurement will be started again, however, with new criteria. The conditions and results mentioned under III. will apply.

B) In the presence of high friction values, that is great vehicle deceleration and high pilot pressure, the pump will be switched on pulsewise after response of the travel switch 27 simultaneously with the first pressure-increase phase, that means switching back of the inlet valve to the opened position. This switching on of the pump will take place only if the pressure decrease has been performed before exceeding a minimum period of time, that means if for instance the pressure-decrease time was longer than 20 to 25 msec. Subsequently, the switch-on time of the pump will be conformed to the actual pressure-decrease time; for example, actuation times of the pump of 100 msec are assigned to pressure-decrease times of 20 to 25 msec. Upon attainment of a pressure-decrease time of roughly 100 to 150 msec, the pump will be switched on as long as until the brake pedal is reset so far that the travel switch has regained its initial position. Subsequently, the hydraulic pump will be switched on and off in direct dependence on the switch position of the travel switch, the pedal being positioned thereby.

Figure 2:
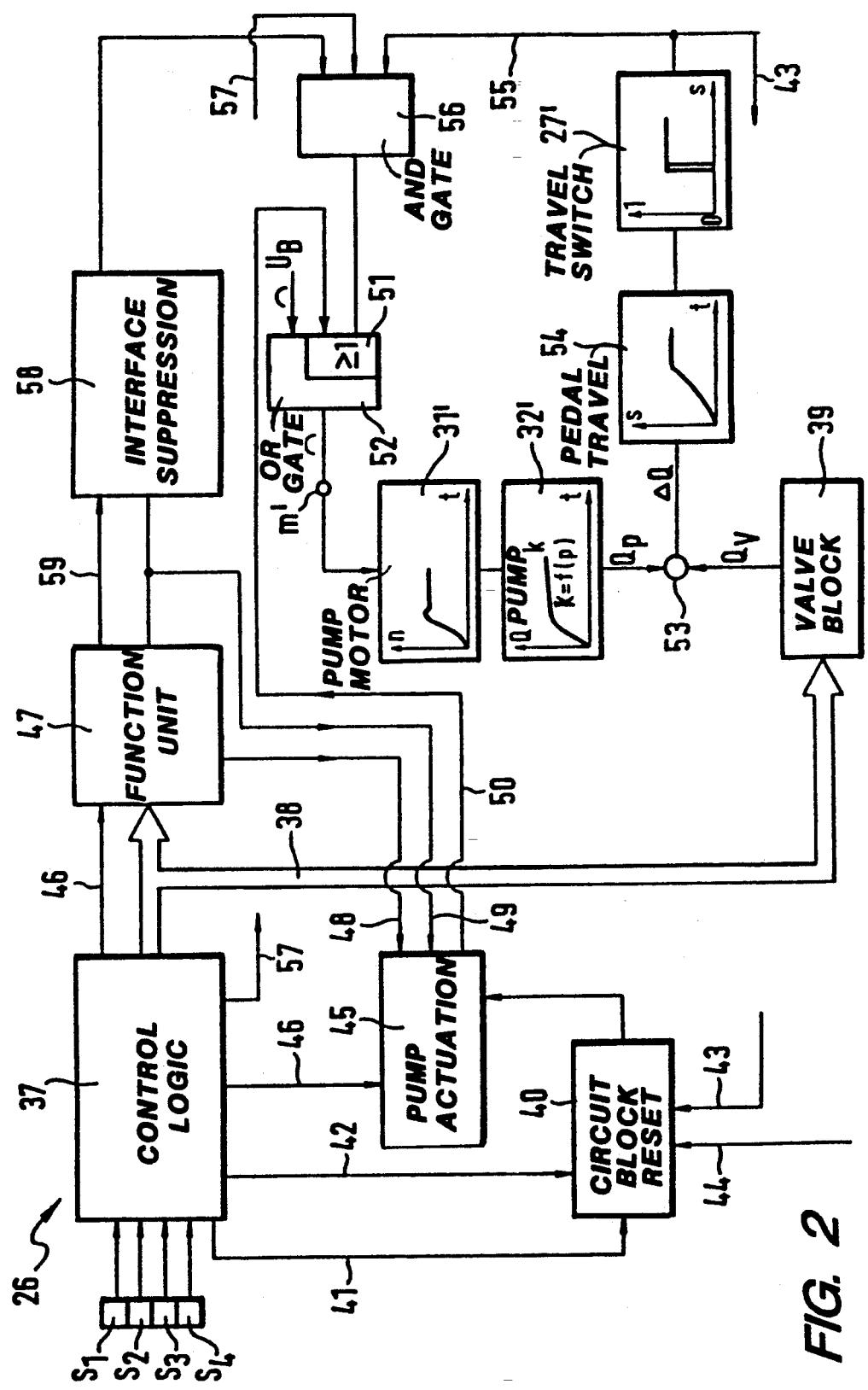
FIG. 2 shows, in function units, a type of embodiment of a circuit configuration according to this invention.

FIG. 2 shows an embodiment of a circuit configuration having the aforedescribed mode of effect.

The whole circuitry is part of the controller 26 according to FIG. 1. After being conditioned, the output signals of the wheel sensors S1 to S4 are delivered to a control logic 37, which latter can be realised by hard-wired or programmed circuits, and are assessed therein. The braking-pressure control signals are generated in the control logic 37 and are supplied via a line system 38 to a valve block 39 which comprises the inlet valves and outlet valves 17 to 24 according to FIG. 1.

A circuit block 40 which serves to determine the instantaneous friction value and/or coefficient of friction and the control frequency is supplied via a line 41 with a signal representative of the vehicle reference speed $v_{REF}$ and via a line 42 with a signal representative of the appearance of stable control phases. Via a line 43 the circuit block 40 is informed about the switch position of a travel switch 27' and/or the travel switch 27 according to FIG. 1. Further, there is provision of a reset input to which a signal 44 is applied in the absence of any anti-lock control operation. The output signal of the circuit block 40 is supplied to a "pump actuation" 45 which determines the activation of the hydraulic pump (32 in FIG. 1) in dependence on the control frequency, the friction value, the sum of the pressure-increase pulses and the sum of the pressure-decrease pulses. Besides the switch position of the travel switch 27' is taken into account. Via a line 46 the logic 37 of the pump control 45 signals the occurrence of unstable control phases. The sum of the pressure-decrease times and the sum of the pressure increase times are derived from the valve-actuating signals in a function unit 47. Signals indicative of these sums are transmitted via lines 48 and 49 from the function block 47 to the pump control 45. The output signal of the pump control 45 propagates via a line 50 and via an OR-gate 51 to the hydraulic pump; m' symbolizes the connecting contact, 31' the pump drive motor and 32' the hydraulic pump in FIG. 2. When a signal is applied to the input of the OR-gate 51, the pump drive motor 31' will be connected via a switch 52 to a current source $U_B$—this is in general the vehicle battery. The number of rotations n as a function of time t is shown symbolically in the function unit 31' of the drive motor, while the rate of delivery Q is shown in function unit 32' as a function of time t.

A difference delta Q results from the rate of delivery $Q_p$ responsive to the braking pressure and from the pressure fluid consumption $Q_V$ which, above all, is determined by the pressure decrease during the anti-lock control operation. The interface is designated by 53 in FIG. 2. This value delta Q defines the position of the pistons in the interior of the master cylinder and hence the pedal travel, illustrated by the diagram 54. The travel switch 27 and/or said's switch contact 27' issues an output signal as soon as a switch threshold is surpassed on actuation of the brake pedal and on advance movement of the pistons. The occurrence of an output signal at the travel switch 27 (27') is signaled to the circuit block 40 via the line 43 and to an AND-gate 56 via the line 55. Via this AND-gate 56 and via the OR-gate 51, the motor-pump aggregate 31', 32' will always be actuated when the travel switch 27' responds, when at the same time the control logic 37 via a signal line 57 reports the signal condition "presssure-increase phase" and when moreover a signal is applied to the output of an interference suppression or filter circuitry 58.

It is the purpose of circuit 58 to eliminate above all the consequences of road trouble such as road holes, sleepers and the like which can fake a control demand on the individual wheels. To this end, the sum of the pressure-decrease signals, supplied via line 49, is assessed when an anti-lock control operation commences. The signal condition changes on a line 59 when an anti-lock control operation commences.

For the sake of clarity, the embodiment according to FIG. 2 is limited to the vital functions.

Consequently, even in the event of response of the travel switch 27', the interference suppression 58 admits switching-on of the pump 32' only if the sum of the braking-pressure decrease signals has reached a predetermined limit value upon the commencement of an anti-lock control operation. A sudden resetting of the brake pedal due to unevenness of the road surface, e.g. because of a sleeper, is prevented this way.

What is claimed is:

1. An anti-lock brake system for an automotive vehicle having a plurality of wheels, said system comprising:
    a brake pedal;
    a plurality of wheel brakes associated with said wheels of said automotive vehicle;
    an auxiliary-pressure source for supplying pressure fluid;
    a master cylinder in fluid communication with said auxiliary-pressure source and having a piston coupled to said brake pedal which is displaceable in a first direction in response to actuation of said brake pedal and in a second direction, opposite to the first direction, in response to pressure fluid supplied by said auxiliary-pressure source;
    valve means for selectively:
        (a) supplying pressure fluid to said wheel brakes to increase fluid pressure in said wheel brakes, and
        (b) releasing pressure fluid from said wheel brakes to decrease fluid pressure in said wheel brakes;
    first sensing means for sensing the rotational behavior of said wheels of said vehicle and for generating wheel behavior signals representative of the rotational behavior of said wheels;
    second sensing means for sensing the position of said piston of said master cylinder and for generating a position signal upon a prescribed displacement of said piston in the first direction in response to actuation of said brake pedal;
    and circuit means responsive to said wheel behavior signals and said position signal for:
        (a) determining an imminent wheel lock condition and initiating anti-lock control,
        (b) controlling said valve means during anti-lock control to selectively:
            (i) supply pressure to said wheel brakes to increase fluid pressure in said wheel brakes, and
            (ii) release pressure fluid from said wheel brakes to decrease fluid pressure in said wheel brakes,
        (c) determining during anti-lock control:
            (i) an instantaneous friction value based on the road coefficient of friction, and
            (ii) a control frequency based on the stable control phases of the wheel for which the imminent wheel lock condition has been determined,
        (d) summing during anti-lock control the fluid pressure increases in said wheel brakes and summing the fluid pressure decreases in said wheel brakes, and
        (e) actuating during anti-lock control said auxiliary-pressure source to supply pressure fluid to said master cylinder in response to at least one of:
            (i) actual pressure fluid requirements during anti-lock control dependent upon:
                (1) the instantaneous friction value,
                (2) the control frequency, and
                (3) the sum of the fluid pressure increases in said wheel brakes and the sum of the fluid pressure decreases in said wheel brakes, and
            (ii) the presence of said position signal.

2. An anti-lock brake system according to claim 1 wherein said circuit means include:
    (a) means for comparing the time periods of the fluid pressure increases and the fluid pressure decreases and the number of stable control phases with predetermined limit values, and
    (b) means for determining the time periods of the fluid pressure increases and the fluid pressure decreases and the number of stable control phases with predetermined limit values, and said auxiliary-pressure source remains actuated until the occurrence of one of:
  (a) the next fluid pressure decrease, and
  (b) the expiration of a predetermined period of time.

3. An anti-lock brake system according to claim 1 wherein said circuit means include:
  (a) means for determining during anti-lock control the deceleration of said automotive vehicle,
  (b) means for comparing the time periods of the fluid pressure increases and the fluid pressure decreases with a predetermined limit value selected from a plurality of predetermined limit values related to the deceleration of said automotive vehicle, the selected predetermined limit value related to the determined deceleration of said automotive vehicle, and
  (c) means for determining when the time periods of the fluid pressure increases and the fluid pressure decreases exceed the selected predetermined limit value, and said auxiliary-pressure source remains actuated until the occurrence of one of:
  (a) the next fluid pressure decrease, and
  (b) the expiration of a predetermined period of time.

4. An anti-lock brake system according to claim 3 wherein the predetermined limit value is relatively short for a relatively high related deceleration and increases as the deceleration decreases.

5. An anti-lock brake system according to claim 4 wherein the predetermined limit values range from between 0.6 seconds and 1.5 seconds for a vehicle deceleration of approximately 0.7G to between 4.5 seconds to 8 seconds for a vehicle deceleration of approximately 0.1G.

* * * * *